United States Patent
Wang et al.

(10) Patent No.: US 12,028,292 B2
(45) Date of Patent: Jul. 2, 2024

(54) REFERENCE SIGNAL TRANSMISSION TECHNIQUES

(71) Applicant: ZTE Corporation, Guangdong (CN)

(72) Inventors: Yuxin Wang, Guangdong (CN); Hao Wu, Guangdong (CN); Zhaohua Lu, Guangdong (CN); Yong Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 129 days.

(21) Appl. No.: 17/871,713

(22) Filed: Jul. 22, 2022

(65) Prior Publication Data
US 2022/0385438 A1    Dec. 1, 2022

Related U.S. Application Data

(63) Continuation of application No. PCT/CN2021/095025, filed on May 21, 2021.

(51) Int. Cl.
*H04L 5/00*    (2006.01)

(52) U.S. Cl.
CPC .......... *H04L 5/0092* (2013.01); *H04L 5/0042* (2013.01); *H04L 5/0051* (2013.01)

(58) Field of Classification Search
CPC .... H04L 5/0092; H04L 5/0042; H04L 5/0051
See application file for complete search history.

(56) References Cited

U.S. PATENT DOCUMENTS

| | | | |
|---|---|---|---|
| 2021/0127396 A1 | 4/2021 | Su et al. | |
| 2022/0104233 A1* | 3/2022 | Jeon | H04L 5/0051 |
| 2023/0023724 A1* | 1/2023 | Wu | H04L 5/0051 |
| 2023/0116653 A1* | 4/2023 | Abdelghaffar | H04W 72/0446 370/329 |
| 2024/0022379 A1* | 1/2024 | Wang | H04L 5/0012 |

FOREIGN PATENT DOCUMENTS

| | | |
|---|---|---|
| CN | 109769300 A | 5/2019 |
| CN | 111066256 A | 4/2020 |
| EP | 3573392 B1 | 3/2021 |

(Continued)

OTHER PUBLICATIONS

3GPP TSG-RAN WG1 Meeting #104e, Qualcomm Incorporated, 8.1.3, Feb. 5, 2021.*

(Continued)

*Primary Examiner* — Shukri Taha
(74) *Attorney, Agent, or Firm* — Perkins Coie LLP

(57) ABSTRACT

Techniques are described to perform transmission of a reference signal such as a sounding reference signal (SRS). An example wireless communication method includes performing, by a network device, a first transmission that indicates a plurality of partial frequency factor values to a communication device, wherein each partial frequency factor value indicates a number used to determine a reduced number of resource blocks by the communication device to transmit a reference signal; and performing a second transmission, after the first transmission and to the communication device, of one or more bits that indicate a partial frequency factor value from the plurality of partial frequency factor values.

16 Claims, 10 Drawing Sheets

(56) References Cited

FOREIGN PATENT DOCUMENTS

WO     WO-2022126148 A2 *   6/2022   .......... H04L 5/0091

OTHER PUBLICATIONS

ZTE, "Maintenance of UL Reference Signals for NR Positioning," 3GPP TSG RAN WG1 Meeting #100bis-e, e-Meeting, R1-2001601, 4 pages, Apr. 20-30, 2020.

Interdigital Communications, "Considerations on SRS for NR," 3GPP TSG RAN WG1 Meeting #88, Athens, Greece, R1-1702333, 3 pages, Feb. 13-17, 2017.

Nokia et al., "Enhancements on SRS flexibility, coverage and capacity," 3GPP TSG RAN WG1 Meeting #104-e, e-Meeting, R1-2101010, 19 pages, Jan. 25-Feb. 5, 2021.

ZTE, "Enhancements on SRS flexibility, coverage and capacity," 3GPP TSG RAN WG1, Meeting #104-e, e-Meeting, R1-2100290, 13 pages, Jan. 25-Feb. 5, 2021.

Huawei et al., "SRS Enhancements in Rel-17," 3GPP TSG RAN WG1 Meeting #104bis-e, e-Meeting, R1-2102338, 18 pages, Apr. 12-20, 2021.

Futurewei, "Enhancements on SRS flexibility, coverage and capacity," 3GPP TSG RAN WG1 Meeting #104-e, e-Meeting, R1-2100042, 25 pages, Jan. 25-Feb. 5, 2021.

ZTE, "FL summary #1 on SRS enhancements," 3GPP TSG RAN WG1 Meeting #104b-e, e-Meeting, R1-2102674, 46 pages, Apr. 12-20, 2021.

Lenovo et al., "Enhancements on SRS," 3GPP TSG RAN WG1 Meeting #104-e, e-Meeting, R1-2100277, 10 pages, Jan. 25-Feb. 5, 2021.

LG Electronics, "Enhancements on SRS flexibility, coverage and capacity," 3GPP TSG RAN WG1 #104b-e, e-Meeting, R1-2103509, 8 pages, Apr. 12-20, 2021.

Oppo, "Enhancements on SRS flexibility, coverage and capacity," 3GPP TSG RAN WG1 Meeting #104-e, e-Meeting, R1-2100123, 9 pages, Jan. 25-Feb. 5, 2021.

NTT DOCOMO, Inc., "Discussion on SRS enhancement," 3GPP TSG RAN WG1 Meeting #104-e, e-Meeting, R1-2101602, 13 pages, Jan. 25-Feb. 5, 2021.

Intel Corporation, "Discussion on SRS enhancements," 3GPP TSG RAN WG1 Meeting #104b-e, e-Meeting, R1-2103019, 19 pages, Apr. 12-20, 2021.

Qualcomm Incorporated, "Discussion on SRS enhancement," 3GPP TSG RAN WG1 Meeting #104-e, e-Meeting, R1-2101451, 41 pages, Jan. 25-Feb. 5, 2021.

Vivo, "Further discussion on SRS enhancement," 3GPP TSG RAN WG1 Meeting #104b-e, e-Meeting, R1-2102511, 22 pages, Apr. 12-20, 2021.

CATT, "Enhancements on Rel-17 SRS," 3GPP TSG RAN WG1 Meeting #104bis-e, e-Meeting, R1-2102603, 12 pages, Apr. 12-20, 2021.

International Search Report and Written Opinion for International Application No. PCT/CN2021/095025, mailed on Feb. 21, 2022 (9 pages).

* cited by examiner

REFERENCE SIGNAL TRANSMISSION TECHNIQUES

CROSS REFERENCE TO RELATED APPLICATIONS

This patent document is a continuation of and claims benefit of priority to International Patent Application No. PCT/CN2021/095025, filed on May 21, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for enhancing flexibility of transmission of a reference signal, such as a sounding reference signal (SRS).

A first wireless communication method, comprises performing, by a network device, a first transmission that indicates a plurality of partial frequency factor values to a communication device, wherein each partial frequency factor value indicates a number used to determine a reduced number of resource blocks by the communication device to transmit a reference signal; and performing a second transmission, after the first transmission and to the communication device, of one or more bits that indicate a partial frequency factor value from the plurality of partial frequency factor values.

In some embodiments of the first wireless communication method, the plurality of frequency factor values are transmitted in the first transmission using a radio resource control (RRC) signal or a medium access control-control element (MAC CE) signal. In some embodiments of the first wireless communication method, the one or more bits are transmitted in the second transmission in one or more most significant bits (MSBs) in a modulation and coding scheme (MCS) field in a downlink control information (DCI).

A second wireless communication method comprises performing, by a network device, a first transmission that indicates multiple sets of values to a communication device, wherein each set of values includes: (1) a partial frequency factor value that indicates a number used to determine a reduced number of resource blocks by the communication device to transmit a reference signal, and (2) an offset value that indicates a start resource block index of the reduced number of resource blocks where the communication device is to transmit the reference signal, and wherein each set of values is associated with a reference signal resource or a reference signal resource set; and performing a second transmission, after the first transmission and to the communication device, of one or more bits that indicate a set of one partial frequency factor value and one offset value from the multiple sets of values.

In some embodiments of the second wireless communication method, the multiple sets of values are transmitted in the first transmission using a radio resource control (RRC) signal or a medium access control-control element (MAC CE) signal. In some embodiments of the second wireless communication method, the one or more bits are transmitted in the second transmission in one or more most significant bits (MSBs) in a modulation and coding scheme (MCS) field in a downlink control information (DCI).

A third wireless communication method comprises receiving, by a communication device, a first transmission that indicates a plurality of partial frequency factor values, wherein each partial frequency factor value indicates a number used to determine a reduced number of resource blocks by the communication device to transmit a reference signal; and receiving a second transmission, after the first transmission by the communication device, of one or more bits that indicate a partial frequency factor value from the plurality of partial frequency factor values. In some embodiments of the third wireless communication method, the plurality of frequency factor values are received in the first transmission using a radio resource control (RRC) signal or a medium access control-control element (MAC CE) signal. In some embodiments of the third wireless communication method, the one or more bits are received in the second transmission in one or more most significant bits (MSBs) in a modulation and coding scheme (MCS) field in a downlink control information (DCI).

A fourth wireless communication method comprises receiving, by a communication device, a first transmission that indicates multiple sets of values, wherein each set of values includes: (1) a partial frequency factor value that indicates a number used to determine a reduced number of resource blocks by the communication device to transmit a reference signal, and (2) an offset value that indicates a start resource block index of the reduced number of resource blocks where the communication device is to transmit the reference signal, and wherein each set of values is associated with a reference signal resource or a reference signal resource set; and receiving a second transmission, after the first transmission and by the communication device, of one or more bits that indicate a set of one partial frequency factor value and one offset value from the multiple sets of values.

In some embodiments of the fourth wireless communication method, the multiple sets of values are received in the first transmission using a radio resource control (RRC) signal or a medium access control-control element (MAC CE) signal. In some embodiments of the fourth wireless communication method, the one or more bits are received in the second transmission in one or more most significant bits (MSBs) in a modulation and coding scheme (MCS) field in a downlink control information (DCI).

In some embodiments of the first wireless communication method to fourth wireless communication method, the reduced number of resource blocks are determined by dividing a number of contiguous resource blocks by the partial frequency factor value, and the number of contiguous resource blocks are indicated by a bandwidth of the reference signal and a bandwidth configuration of the reference signal.

A fifth wireless communication method comprises determining, by a communication device, a location of a reference slot based on a relationship between a triggering offset value and each of a plurality of values that indicate a number of slots after the reference slot where a reference signal is to be transmitted, wherein the triggering offset value indicates a difference between the location of the reference slot and a slot where the reference signal is to be transmitted; and transmitting, by the communication device, the reference signal at the slot after the reference slot based on the determining. In some embodiments of the fifth wireless communication method, the communication device determines that the reference slot is another slot that includes a triggering downlink control information (DCI) in response to all of the plurality values being less than or equal to the triggering offset value, and the triggering DCI received by the communication device triggers the communication device to transmit the reference signal.

A sixth wireless communication method comprises determining, by a communication device, whether a reference slot is a first slot that includes a triggering downlink control information (DCI) or a second slot that is indicated by a triggering offset value based on whether one or more available slots are present between the first slot and the second slot, wherein the triggering DCI received by the communication device triggers the communication device to transmit a reference signal, and wherein the triggering offset value indicates a difference between a location of the reference slot and a slot where the reference signal is to be transmitted; and transmitting, by the communication device, the reference signal at the slot after the first slot or the second slot based on the determining.

In some embodiments of the sixth wireless communication method, the communication device determines that the reference slot is the first slot in response to a presence of the one or more available slots between the first slot and the second slot. In some embodiments of the sixth wireless communication method, the communication device determines that the reference slot is the second slot in response to an absence of the one or more available slots between the first slot and the second slot.

A seventh wireless communication method comprises determining, by a communication device, whether a reference slot is a first slot that includes a triggering downlink control information (DCI) or a second slot that is indicated by a triggering offset value based on whether a plurality of values are functions of the triggering offset value, wherein the triggering DCI received by the communication device triggers the communication device to transmit a reference signal, and wherein the triggering offset value indicates a difference between a location of the reference slot and a slot where the reference signal is to be transmitted, and wherein each of the plurality of values indicate a number of slots after the reference slot where the reference signal is to be transmitted; and transmitting, by the communication device, the reference signal at a slot after the first slot or the second slot based on the determining.

In some embodiments of the seventh wireless communication method, the communication device determines that the reference slot is the first slot in response to all of the plurality of values being functions of the triggering offset value. In some embodiments of the seventh wireless communication method, the communication device determines that the reference slot is the second slot due to at least one of the plurality of values not being a function of the triggering offset value.

An eighth wireless communication method comprises determining, by a communication device, that a reference slot is a first slot that includes a triggering downlink control information (DCI) in response to a plurality of values being functions of an available slot number located in between the first slot and a second slot that is indicated by a triggering offset value, wherein the triggering DCI received by the communication device triggers the communication device to transmit a reference signal, and wherein the triggering offset value indicates a difference between a location of the reference slot and a slot where the reference signal is to be transmitted, and wherein each of the plurality of values indicate a number of slots after the reference slot where the reference signal is to be transmitted; and transmitting, by the communication device, the reference signal at a slot after the first slot based on the determining.

In some embodiments of the first wireless communication method to eighth wireless communication method, the reference signal includes a sounding reference signal (SRS).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1A:
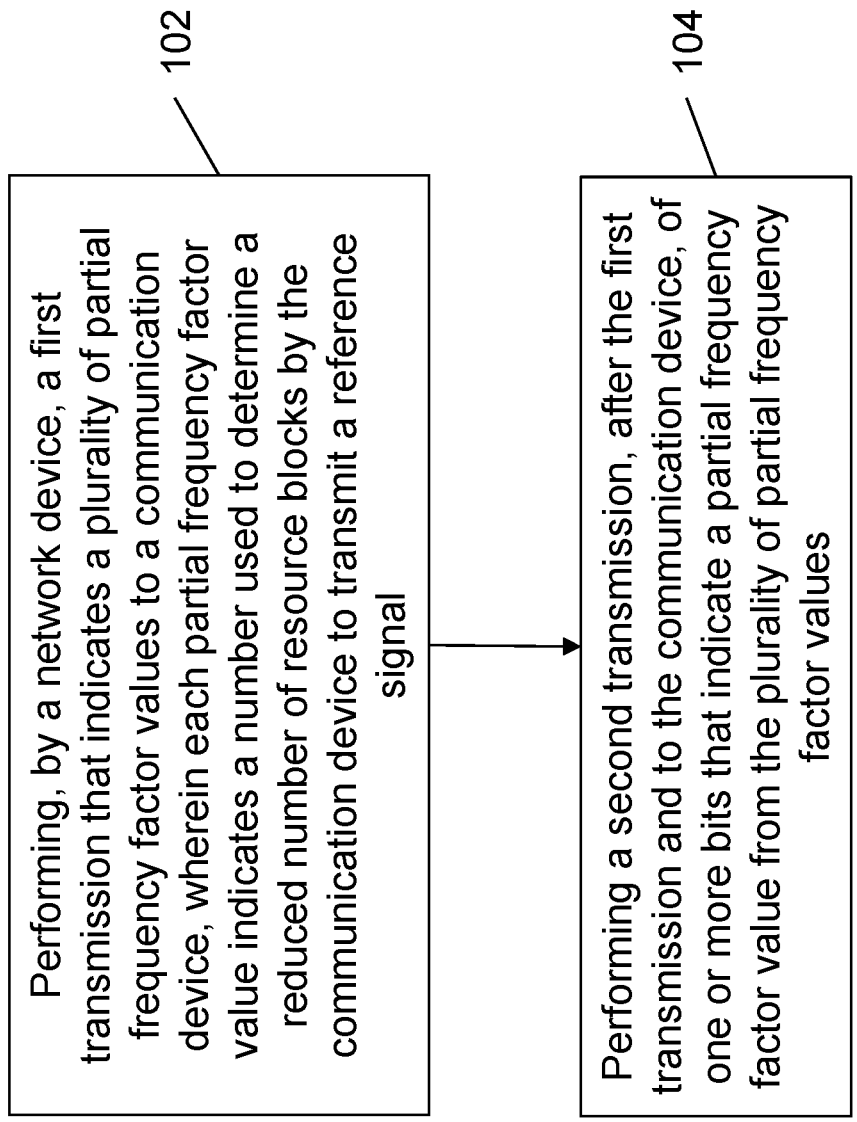
FIG. 1A shows an example flowchart of a method of transmitting a partial frequency factor value.

In the study of Rel-17 New Radio (NR) Access, a growing number of UEs can be located in a serving cell (e.g., a first base station) and either receive signal from the wireless network node (e.g., a second base station) or transmit signal to the wireless network node. Sounding reference signal (SRS) is a signal used for measuring or determining channel state information (CSI) of a channel between the communication node (e.g., base station) and the communication terminal device (e.g., user equipment (UE)). The enhancement of SRS flexibility, coverage and capacity is an important technical field to study at least because the CSI can be important to the throughput enhancement of a cell.

For the enhancement of SRS flexibility, the determination of a location of a reference slot using an aperiodic SRS triggering offset is a remaining issue. There are two options that are studied. The first option includes defining the reference slot as the slot with triggering DCI, where the triggering DCI is transmitted by the base station to trigger the UE to transmit SRS with SRS resource that is set by the triggering DCI. The second option includes defining the reference slot as the slot indicated by the legacy triggering offset (indicated by "k"), where the triggering offset (k) indicates a slot offset (e.g., a slot offset value) relative to a slot that includes a triggering DCI, where k may be configured by RRC signaling sent by the base station to the UE. Thus, for example, the slot offset (k) indicates a difference between a slot location where the triggering DCI is received by the UE and a slot where the SRS is to be transmitted so that the UE may determine a location where an SRS may be transmitted by adding the slot offset value (k) to a slot where the triggering DCI is received by the UE. For the enhancement of SRS coverage and capacity, the method of partial frequency SRS transmission is introduced to support transmission of SRS only in $$\frac{1}{P_F} m_{SRS,B_{SRS}}$$

contiguous resource mocks (RBs) in one OFDM symbol, where $m_{SRS,B_{SRS}}$ indicates the number of RBs configured by $B_{SRS}$ and $C_{SRS}$ where the UE transmits SRS, where $B_{SRS}$ is a UE specific parameter whose value indicates a SRS bandwidth where $C_{SRS}$ is a UE specific parameter configured by a base station whose value indicates a SRS bandwidth configuration, and where the UE can transmit the SRS in $$\frac{1}{P_F} m_{SRS,B_{SRS}}$$

contiguous RBs. However, the signaling of the partial frequency factor $P_F$ is still a remaining issue. $P_F$ indicates a number or a value that is used to divide the number of RBs indicated by $m_{SRS,B_{SRS}}$ to obtain a reduced number of RBs where the SRS can be transmitted by a UE.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

In the LTE system, the communication terminal device (e.g., UE) can regularly transmit a uplink (UL) SRS on the last data symbol of a sub-frame based on parameters (e.g. frequency band, frequency domain position, sequence cyclic shift, period, sub-frame offset, . . . , etc.) indicated by the communication node (e.g., base station). The communication node determines CSI of UL channels of the UE based on the received SRS and performs operations (e.g. frequency selection scheduling and close-loop power control) according to the determined CSI.

According to LTE release 10, non-precoding SRS(s) should be used in UL communications (e.g., antenna dedicated SRS) and de-modulation reference signal (DMRS) of a physical UL shared channel (PUSCH) should perform precoding. By receiving the non-precoding SRS, the communication node is able to estimate original CSI, which cannot be acquired based on the precoding DMRS. Under such a condition, the communication terminal device may require more SRS resources when using multiple antennas to transmit non-precoding SRSs, resulting in a decrease of the number of communication terminal devices simultaneously multiplexing in the system. The communication terminal device may transmit the SRS configured by the higher layer signaling (type-0 trigger) or the DCI (type-1 trigger). The SRS transmissions configured by the higher layer signaling are periodic and the SRS transmissions configured by the DCI are aperiodic. Because LTE-A release 10 adds the aperiodic SRS, a utilization of the SRS resources and a flexibility of scheduling the SRS are improved to some extent.

According to new radio (NR) release 15, usages of the SRS are classified into 4 categories: beam management, codebook based, non-codebook-based, and antenna switching. NR supports beam indication by having a base station inform a UE that a certain PDSCH and/or PDCCH transmission uses the same transmission beam as a configured reference signal (e.g., CSI-RS or SS block). More formally, it implies informing the device that a certain PDSCH and/or PDCCH is transmitted using the same spatial filter as the configured reference signal. In more detail, beam indication is based on the configuration and downlink signaling of so-called Transmission Configuration Indication (TCI) states. Each TCI state includes, among other things, information about a reference signal (e.g., a CSI-RS or an SS block). By associating a certain downlink transmission (e.g., PDCCH or PDSCH) with a certain TCI, the network (or base station) informs the device that it can assume that the downlink transmission is done using the same spatial filter as the reference signal associated with that TCI.

II. Embodiment A

In order to improve SRS coverage, the technique of repetition, partial frequency SRS transmission and SRS Comb size extension can be considered. In one RB, there can be 12 subcarriers in frequency domain, where the element of SRS sequence can be mapped to one subcarrier in every two subcarriers (so that the Comb size is 2) or the element of SRS sequence can be mapped to one subcarrier in every four subcarriers (so that the Comb size is 4). For partial frequency SRS transmission, UE can make power boosting to enhance SRS coverage further. When UE is configured with partial frequency SRS transmission, the UE located at the edge of cell will have a low Modulation and Coding Scheme (MCS). At least in this situation, the highest one bit or two bits of MCS field (or one or more most significant bits (MSBs)) in DCI can be used to indicate the partial frequency factor $P_F$ at least because the one or more MBSs of the MCS field may not be used. One of the technical benefits of indicating the $P_F$ using the one or more MBSs of the existing MCS field is that the number of bits within DCI can be kept the same without increasing signaling overhead. The following two methods can be considered:

Method 1:

Multiple $P_F$ are configured via RRC or MAC CE by base station, and then one $P_F$ is selected by the highest one bit or two bits of MCS field in DCI. The multiple PF can be, for example, {1, 2, 4, 8}.

FIG. 1A shows an example flowchart of a method of transmitting a partial frequency factor value. Operation 102 includes performing, by a network device, a first transmission that indicates a plurality of partial frequency factor values to a communication device, wherein each partial frequency factor value indicates a number used to determine a reduced number of resource blocks by the communication device to transmit a reference signal. Operation 104 includes performing a second transmission, after the first transmission and to the communication device, of one or more bits that indicate a partial frequency factor value from the plurality of partial frequency factor values.

In some embodiments, the plurality of frequency factor values are transmitted in the first transmission using a radio resource control (RRC) signal or a medium access control-control element (MAC CE) signal. In some embodiments, the one or more bits are transmitted in the second transmission in one or more most significant bits (MSBs) in a modulation and coding scheme (MCS) field in a downlink control information (DCI).

Figure 1B:
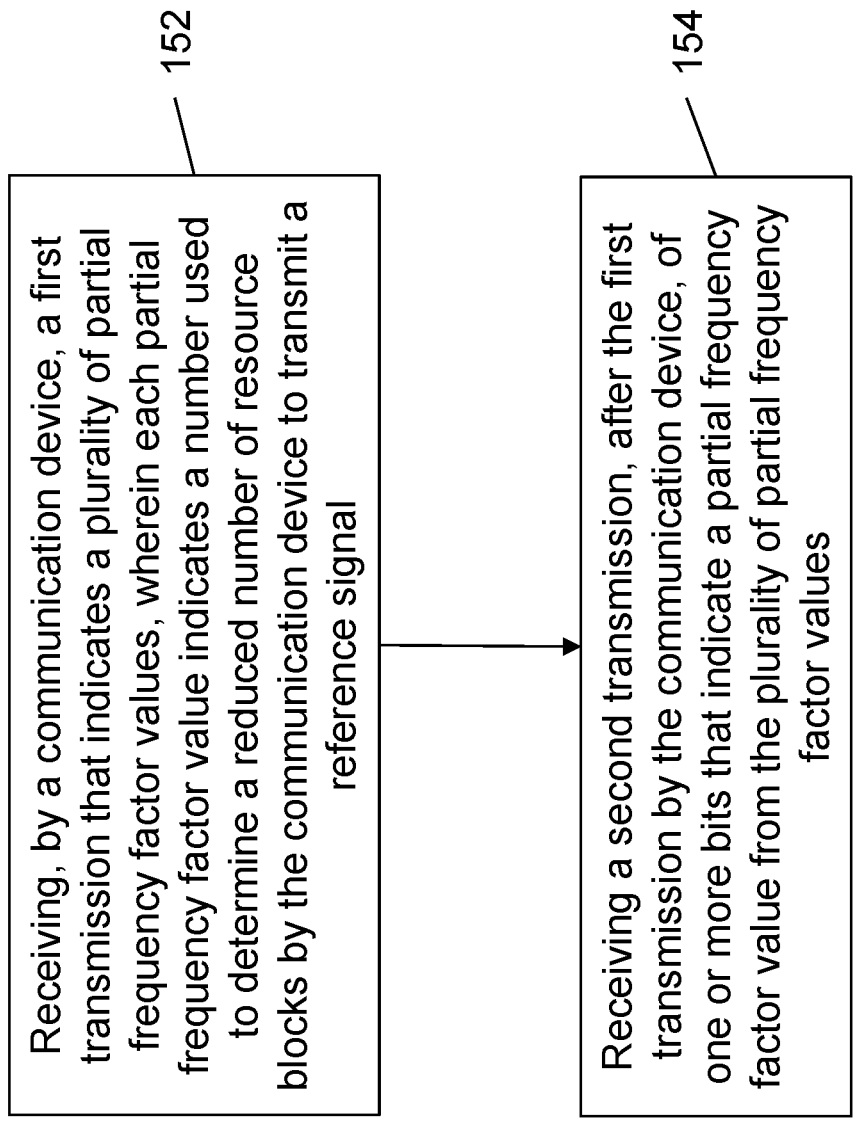
FIG. 1B shows an example flowchart of a method of receiving a partial frequency factor value.

FIG. 1B shows an example flowchart of a method of receiving a partial frequency factor value. Operation 152 includes receiving, by a communication device, a first transmission that indicates a plurality of partial frequency factor values, wherein each partial frequency factor value indicates a number used to determine a reduced number of resource blocks by the communication device to transmit a reference signal. Operation 154 includes receiving a second transmission, after the first transmission by the communication device, of one or more bits that indicate a partial frequency factor value from the plurality of partial frequency factor values.

In some embodiments, the plurality of frequency factor values are received in the first transmission using a radio resource control (RRC) signal or a medium access control-control element (MAC CE) signal. In some embodiments, the one or more bits are received in the second transmission in one or more most significant bits (MSBs) in a modulation and coding scheme (MCS) field in a downlink control information (DCI).

Method 2:

Multiple ($P_F$, $N_{offset}$) are configured or transmitted by a base station to a UE via RRC configuration per SRS resource or per SRS resource set by base station, and then one ($P_F$, $N_{offset}$) is selected by the base station by transmitting to the UE using the highest one bit or two bits (or one or more MSBs) of MCS field in DCI. The $N_{offset}$ indicates to the UE the start RB index of the $P^1_F m_{SRS,B_{SRS}}$ RBs in the $m_{SRS,B_{SRS}}$ RBs. Thus, in some embodiments, ($P_F$, $N_{offset}$) may be indicated jointly by DCI.

In some embodiments, $N_{offset}$ is the start RB index of the $$\frac{1}{P_F} m_{SRS,B_{SRS}}$$

RBs in the $m_{SRS,B_{SRS}}$ RBs. In some embodiments, $B_{SRS} \in \{0, 1, 2, 3\}$ is given by the field b-SRS contained in the higher-layer parameter freqHopping if configured, otherwise $B_{SRS}=0$. In some embodiments, $m_{SRS,B_{SRS}}$, is given by Table 1 via parameter $C_{SRS}$ and $B_{SRS}$ configured by RRC signaling.

TABLE 1

SRS bandwidth configuration

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

Figure 2A:
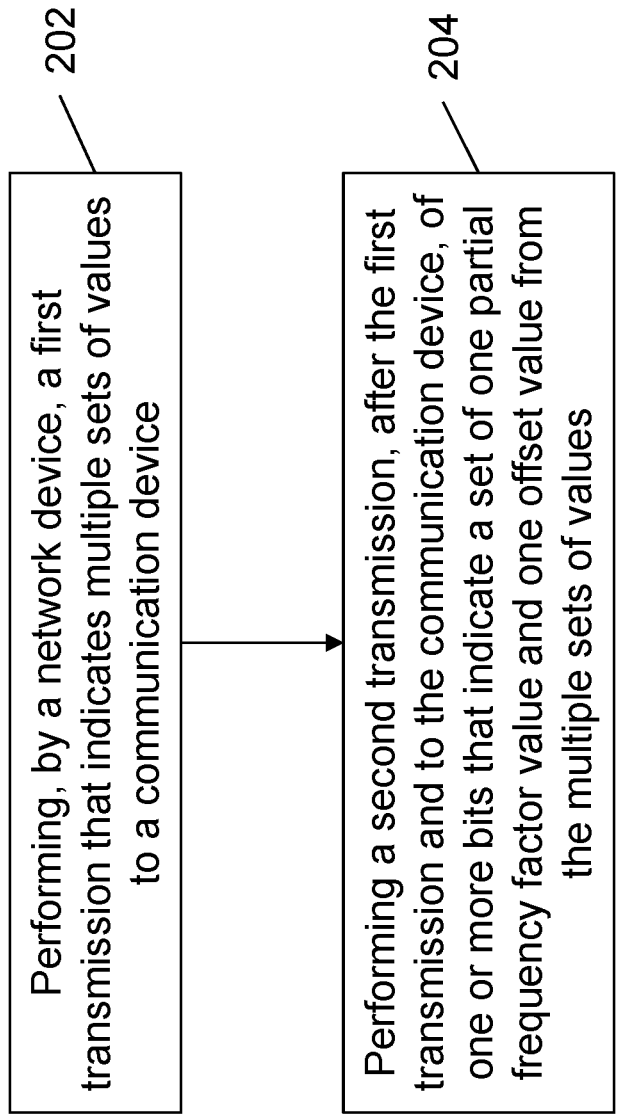
FIG. 2A shows an example flowchart of a method of indicating a set of a partial frequency factor value and an offset value from a plurality of sets of values.

FIG. 2A shows an example flowchart of a method of indicating a set of a partial frequency factor value and an offset value from a plurality of sets of values. Operation 202 includes performing, by a network device, a first transmission that indicates multiple sets of values to a communication device, wherein each set of values includes: (1) a partial frequency factor value that indicates a number used to determine a reduced number of resource blocks by the communication device to transmit a reference signal, and (2) an offset value that indicates a start resource block index of the reduced number of resource blocks where the communication device is to transmit the reference signal, and wherein each set of values is associated with a reference signal resource or a reference signal resource set; and performing a second transmission, after the first transmission and to the communication device, of one or more bits that indicate a set of one partial frequency factor value and one offset value from the multiple sets of values.

In some embodiments, the multiple sets of values are transmitted in the first transmission using a radio resource control (RRC) signal or a medium access control-control element (MAC CE) signal. In some embodiments, the one or more bits are transmitted in the second transmission in one or more most significant bits (MSBs) in a modulation and coding scheme (MCS) field in a downlink control information (DCI).

Figure 2B:
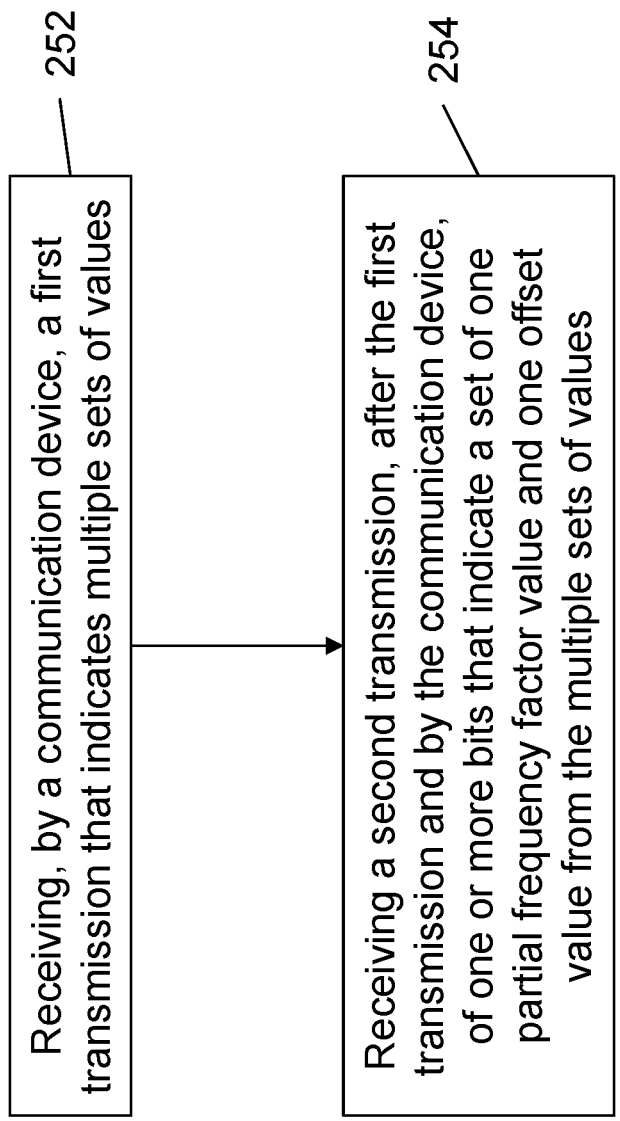
FIG. 2B shows an example flowchart of a method of receiving an indication of a set of a partial frequency factor value and an offset value from a plurality of sets of values.

FIG. 2B shows an example flowchart of a method of receiving an indication of a set of a partial frequency factor value and an offset value from a plurality of sets of values. Operation 252 includes receiving, by a communication device, a first transmission that indicates multiple sets of values, wherein each set of values includes: (1) a partial frequency factor value that indicates a number used to determine a reduced number of resource blocks by the communication device to transmit a reference signal, and (2) an offset value that indicates a start resource block index of the reduced number of resource blocks where the communication device is to transmit the reference signal, and wherein each set of values is associated with a reference signal resource or a reference signal resource set. Operation 254 includes receiving a second transmission, after the first transmission and by the communication device, of one or more bits that indicate a set of one partial frequency factor value and one offset value from the multiple sets of values.

In some embodiments, the multiple sets of values are received in the first transmission using a radio resource control (RRC) signal or a medium access control-control element (MAC CE) signal. In some embodiments, the one or more bits are received in the second transmission in one or more most significant bits (MSBs) in a modulation and coding scheme (MCS) field in a downlink control information (DCI).

In some aspects of Embodiment A, the reduced number of resource blocks are determined by dividing a number of contiguous resource blocks by the partial frequency factor value, and the number of contiguous resource blocks are indicated by a bandwidth of the reference signal and a bandwidth configuration of the reference signal.

III. Embodiment B

NR Rel-15 supports gNB to trigger aperiodic SRS resource set(s) with DCI, to enable dynamic UL or downlink (DL) channel measurement. However, the current specification support for this feature is quite restrictive. The restriction will lead to PDCCH congestion, unnecessary DCI/RS overhead and/or unnecessary UE power consumption. It's needed to enhance network's flexibility when triggering the aperiodic SRS.

In current technology, a given aperiodic SRS resource set can be transmitted in the (t+1)-th available slot counting from a reference slot, where t is indicated from a DCI, or RRC (if only one value of t is configured in RRC), and the candidate values of t at least include 0. Where the available slot is a slot satisfying there are UL or flexible symbol(s) for the time-domain location(s) for all the SRS resources in the resource set and it satisfies UE capability on the minimum timing requirement between triggering PDCCH and all the SRS resources in the resource set. As for the description of the reference slot, the following two options are described in the current technology:

Option 1: Reference slot is the slot with the triggering DCI

Option 2: Reference slot is the slot indicated by the legacy triggering offset (k)

In addition, for both DCI that schedules a PDSCH/PUSCH and DCI 0_1/0_2 without data and without CSI request, four t values are configured by RRC signaling from base station firstly, and then one t value is indicated by the new adding configurable DCI field (up to 2 bits). Each of the t values indicate a number of slots after a reference slot after which the UE is expected to transmit the SRS. Thus, the UE determines that the slot in time domain where the SRS is to be transmitted is a location of the reference slot added to one of the t values.

For the determination of reference slot, following methods can be considered:

Method 1:

A location in time domain of the reference slot is determined by the UE based on relationship between k and t. For example, if four values of t<=k, then the reference slot is the slot with the triggering DCI, otherwise the reference slot is the slot indicated by the legacy triggering offset.

Figure 3:
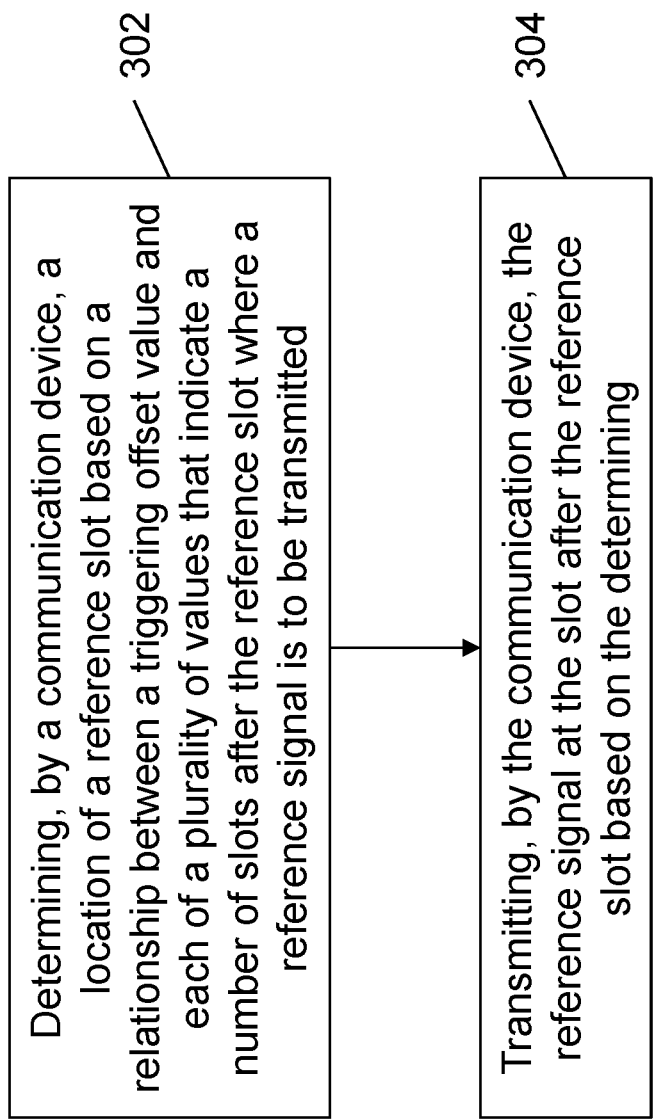
FIGS. 3 to 4 show example flowcharts of methods of transmitting a reference signal.

FIG. 3 shows an example flowchart of a method of transmitting a reference signal. Operation 302 includes determining, by a communication device, a location of a reference slot based on a relationship between a triggering offset value and each of a plurality of values that indicate a number of slots after the reference slot where a reference signal is to be transmitted, wherein the triggering offset value indicates a difference between the location of the reference slot and a slot where the reference signal is to be transmitted. Operation 304 includes transmitting, by the communication device, the reference signal at the slot after the reference slot based on the determining. In some embodiments, the communication device determines that the reference slot is another slot that includes a triggering downlink control information (DCI) in response to all of the plurality values being less than or equal to the triggering offset value, and the triggering DCI received by the communication device triggers the communication device to transmit the reference signal.

Method 2:

In some embodiments, if the UE determines that there is available slot between the slot with the triggering DCI and the slot indicated by the legacy triggering offset, then the UE determines that the reference slot is the slot with the triggering DCI, otherwise the reference slot is the slot indicated by the legacy triggering offset.

Figure 4:
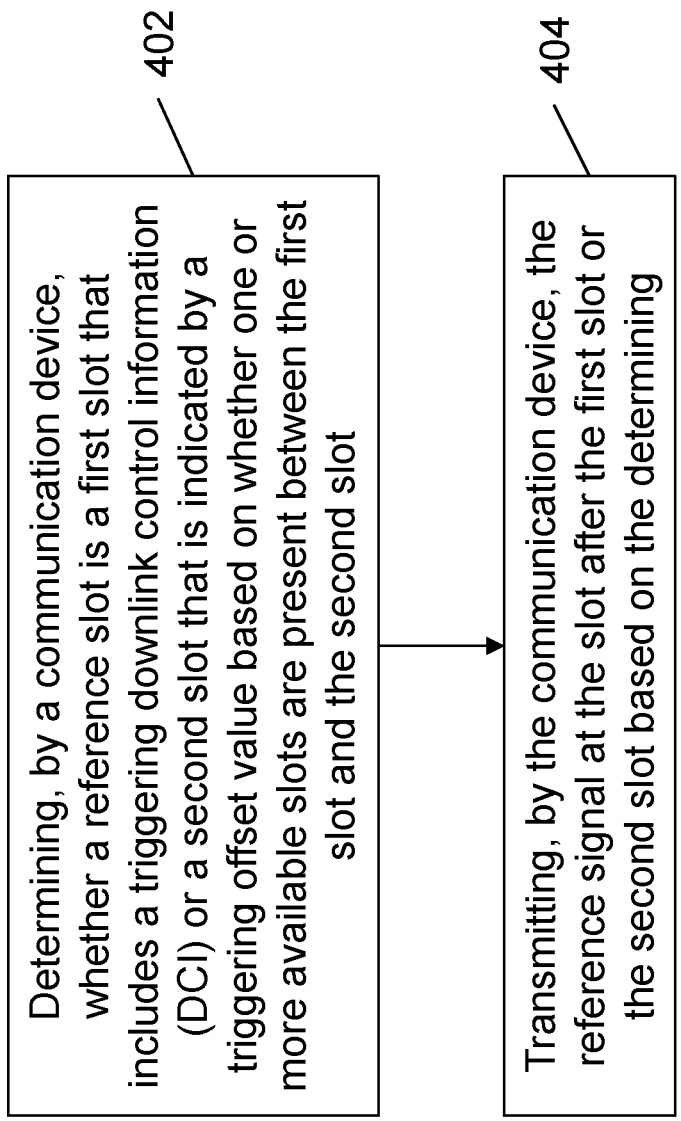

FIG. 4 shows an example flowchart of a method of transmitting a reference signal. Operation 402 includes determining, by a communication device, whether a reference slot is a first slot that includes a triggering downlink control information (DCI) or a second slot that is indicated by a triggering offset value based on whether one or more available slots are present between the first slot and the second slot, wherein the triggering DCI received by the communication device triggers the communication device to transmit a reference signal, and wherein the triggering offset value indicates a difference between a location of the reference slot and a slot where the reference signal is to be transmitted. Operation 404 includes transmitting, by the communication device, the reference signal at the slot after the first slot or the second slot based on the determining. In some embodiments, the communication device determines that the reference slot is the first slot in response to a presence of the one or more available slots between the first slot and the second slot. In some embodiments, the communication device determines that the reference slot is the second slot in response to an absence of the one or more available slots between the first slot and the second slot.
Method 3:

In some embodiments, if the UE determines that t is the function of k, then the UE determines that the reference slot is the slot with the triggering DCI. For example, four values of t configured by RRC are k, k−1, k−2, k−3, or k, k+1, k+2, k+3, or k, 2*k, 3*k, 4*k.

Or, in some embodiments, if the UE determines that t is the function of k, then the UE determines that the reference slot is the slot with the triggering DCI, otherwise the UE determines that the reference slot is the slot indicated by the legacy triggering offset. For example, t is the function of k, four values of t configured by RRC are k, k−1, k−2, k−3, or k, k+1, k+2, k+3, or k, 2*k, 3*k, 4*k.

Figure 7:
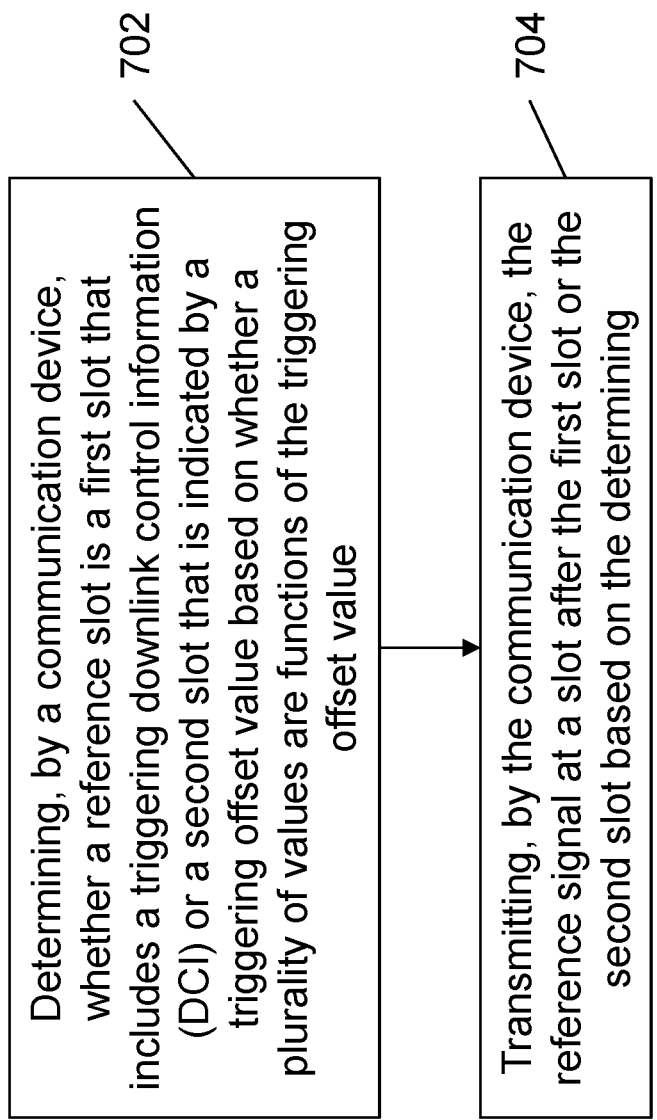
FIGS. 7 to 8 show example flowcharts of methods of transmitting a reference signal.

FIG. 7 shows an example flowchart of a method of transmitting a reference signal. Operation 702 includes determining, by a communication device, whether a reference slot is a first slot that includes a triggering downlink control information (DCI) or a second slot that is indicated by a triggering offset value based on whether a plurality of values are functions of the triggering offset value, wherein the triggering DCI received by the communication device triggers the communication device to transmit a reference signal, and wherein the triggering offset value indicates a difference between a location of the reference slot and a slot where the reference signal is to be transmitted, and wherein each of the plurality of values indicate a number of slots after the reference slot where the reference signal is to be transmitted. Operation 704 includes transmitting, by the communication device, the reference signal at a slot after the first slot or the second slot based on the determining.

In some embodiments, the communication device determines that the reference slot is the first slot in response to all of the plurality of values being functions of the triggering offset value. In some embodiments, the communication device determines that the reference slot is the second slot due to at least one of the plurality of values not being a function of the triggering offset value.
Method 4:

In some embodiments, if the UE determines that t is the function of k0, the UE determines that the reference slot is the slot with the triggering DCI. Where k0 is the available slot number for transmit SRS between the slot with the triggering DCI and the slot indicated by the legacy triggering offset (between slot n and slot n+k).

Figure 8:
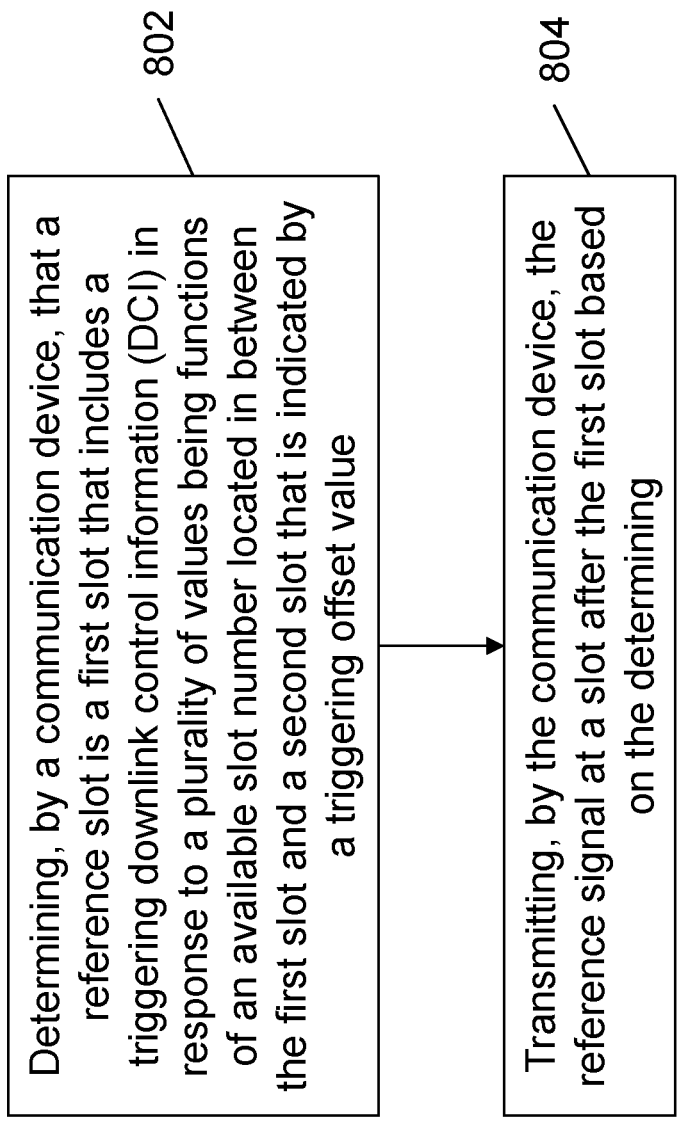

FIG. 8 shows an example flowchart of a method of transmitting a reference signal. Operation 802 includes determining, by a communication device, that a reference slot is a first slot that includes a triggering downlink control information (DCI) in response to a plurality of values being functions of an available slot number located in between the first slot and a second slot that is indicated by a triggering offset value, wherein the triggering DCI received by the communication device triggers the communication device to transmit a reference signal, and wherein the triggering offset value indicates a difference between a location of the reference slot and a slot where the reference signal is to be transmitted, and wherein each of the plurality of values indicate a number of slots after the reference slot where the reference signal is to be transmitted. Operation 804 includes transmitting, by the communication device, the reference signal at a slot after the first slot based on the determining.

In some methods of Embodiments A and/or Embodiment B, the reference signal includes a sounding reference signal (SRS).

Figure 5:
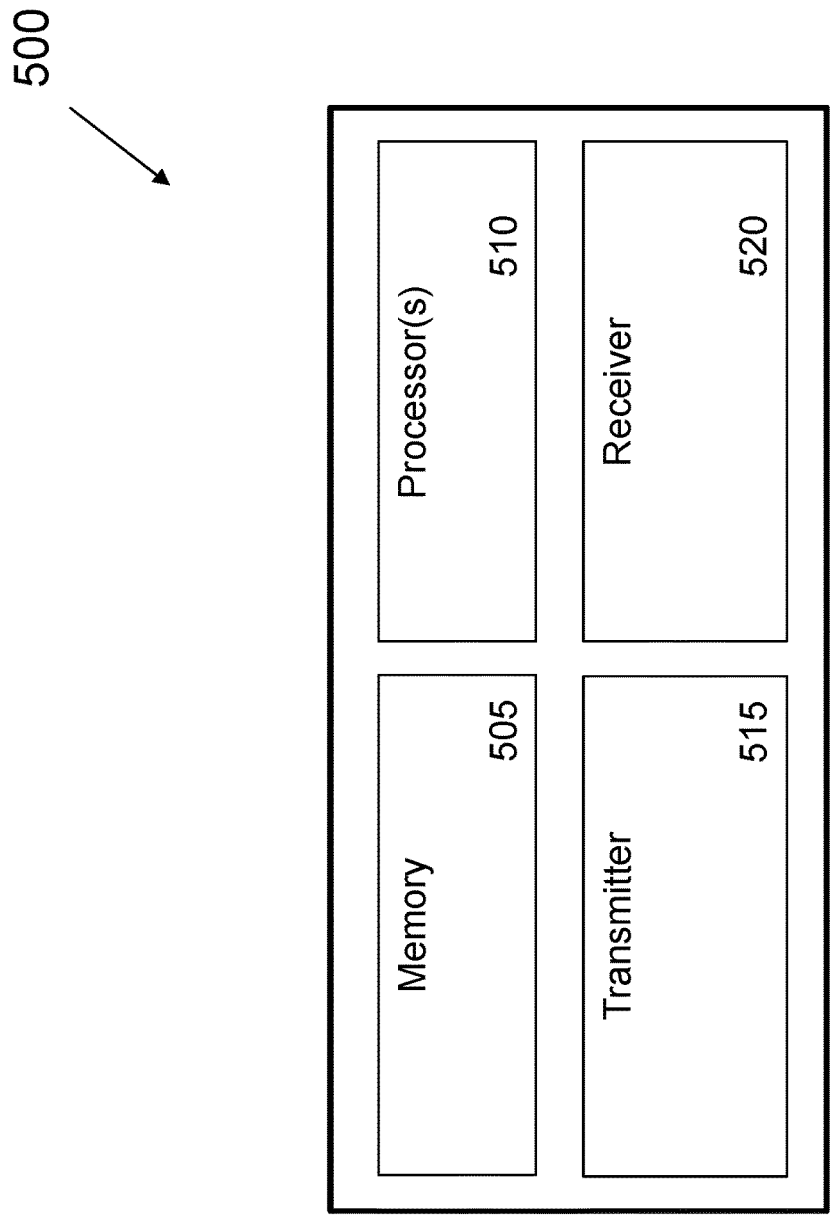
FIG. 5 shows an exemplary block diagram of a hardware platform that may be a part of a network node or a communication device.

FIG. 5 shows an exemplary block diagram of a hardware platform 500 that may be a part of a network node or network device (e.g., base station) or a communication device (e.g., a user equipment (UE)). The hardware platform 500 includes at least one processor 510 and a memory 505 having instructions stored thereupon. The instructions upon execution by the processor 510 configure the hardware platform 500 to perform the operations described in FIGS. 1A to 4 and 7 to 8 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

Figure 6:
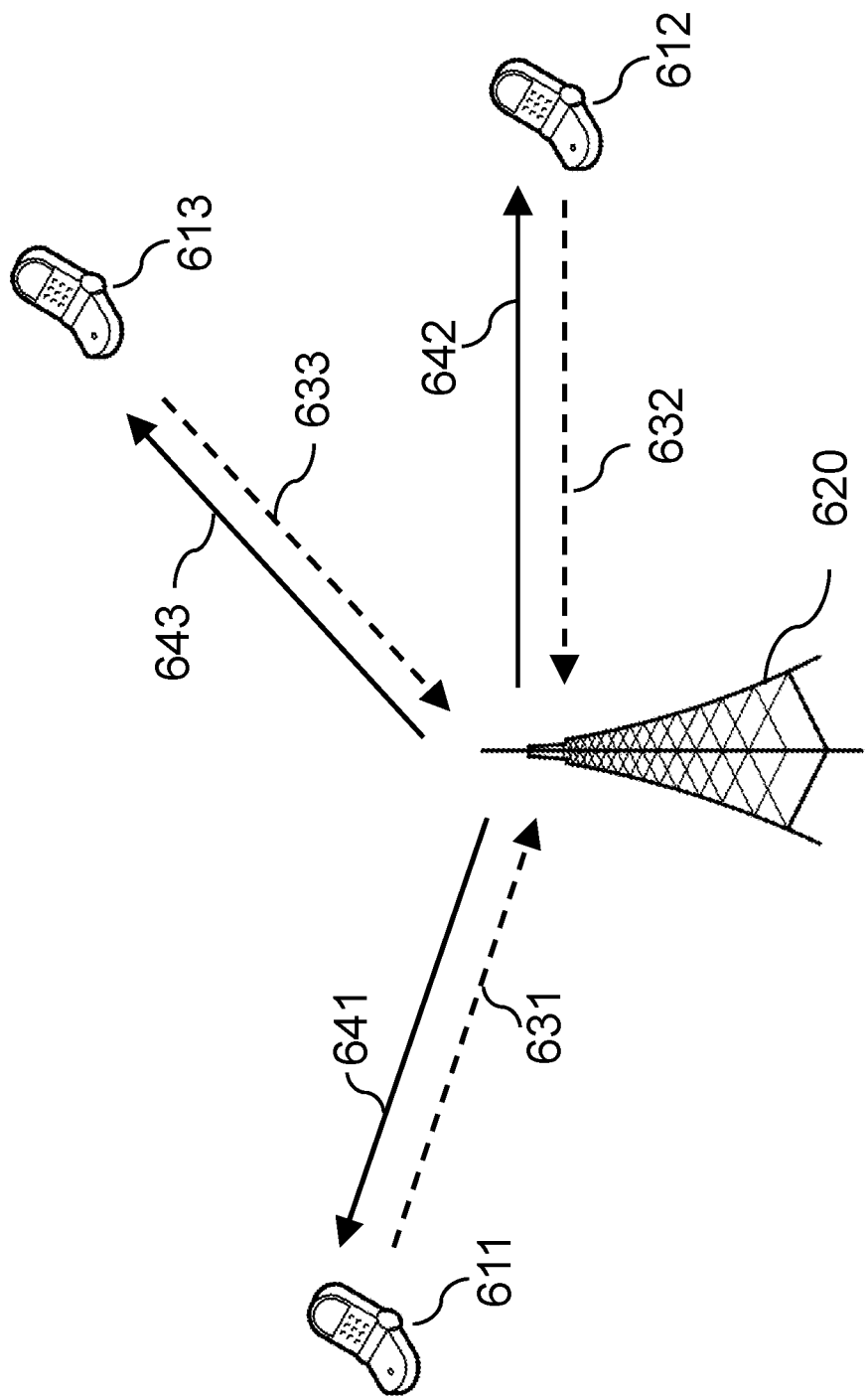
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

The UE may be, for example, a smartphone, a tablet, a mobile computer, a machine to machine (M2M) device, an Internet of Things (IoT) device, and so on.

The following section describes example reference signal related transmission techniques:

In some embodiments, multiple $P_F$ are configured via RRC or MAC CE by base station, and then one $P_F$ is selected by the highest one bit or two bits of MCS field in DCI.

In some embodiments, reference slot is determined based on relationship between k and t.

In some embodiments, if there is available slot between the slot with the triggering DCI and the slot indicated by the legacy triggering offset, then the reference slot is the slot with the triggering DCI, otherwise the reference slot is the slot indicated by the legacy triggering offset.

In some embodiments, under the restriction that t is the function of k, the reference slot is the slot with the triggering DCI.

In some embodiments, under the restriction that t is the function of k0, the reference slot is the slot with the triggering DCI.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer-or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    performing, by a network device, a first transmission that indicates multiple sets of values to a communication device,
        wherein each set of values includes:
            (1) a partial frequency factor value that indicates a number used to determine a reduced number of resource blocks by the communication device to transmit a reference signal, and
            (2) an offset value that indicates a start resource block index of the reduced number of resource blocks where the communication device is to transmit the reference signal,
        wherein each set of values is associated with a reference signal resource or a reference signal resource set,
        wherein the reduced number of resource blocks are determined by a division of a number of contiguous resource blocks by the partial frequency factor value, and
        wherein the number of contiguous resource blocks are indicated by a bandwidth of the reference signal and a bandwidth configuration of the reference signal; and
    performing a second transmission, after the first transmission and to the communication device, of one or more bits that indicate a set of one partial frequency factor value and one offset value from the multiple sets of values.

2. The method of claim 1, wherein the multiple sets of values are transmitted in the first transmission using a radio resource control (RRC) signal or a medium access control-control element (MAC CE) signal.

3. The method of claim 1, wherein the one or more bits are transmitted in the second transmission in one or more most significant bits (MSBs) in a modulation and coding scheme (MCS) field in a downlink control information (DCI).

4. The method of claim 1, wherein the reference signal includes a sounding reference signal (SRS).

5. A wireless communication method, comprising:
    receiving, by a communication device, a first transmission that indicates multiple sets of values,
        wherein each set of values includes:
            (1) a partial frequency factor value that indicates a number used to determine a reduced number of resource blocks by the communication device to transmit a reference signal, and
            (2) an offset value that indicates a start resource block index of the reduced number of resource blocks where the communication device is to transmit the reference signal,
        wherein each set of values is associated with a reference signal resource or a reference signal resource set,
        wherein the reduced number of resource blocks are determined by a division of a number of contiguous resource blocks by the partial frequency factor value, and
        wherein the number of contiguous resource blocks are indicated by a bandwidth of the reference signal and a bandwidth configuration of the reference signal; and receiving a second transmission, after the first transmission and by the communication device, of one or more bits that indicate a set of one partial frequency factor value and one offset value from the multiple sets of values.

6. The method of claim 5, wherein the multiple sets of values are received in the first transmission using a radio resource control (RRC) signal or a medium access control-control element (MAC CE) signal.

7. The method of claim 5, wherein the one or more bits are received in the second transmission in one or more most significant bits (MSBs) in a modulation and coding scheme (MCS) field in a downlink control information (DCI).

8. The method of claim 5, wherein the reference signal includes a sounding reference signal (SRS).

9. A network device for wireless communication, comprising:
   a processor configured to implement a method, the processor configured to:
      perform a first transmission that indicates multiple sets of values to a communication device,
         wherein each set of values includes:
            (1) a partial frequency factor value that indicates a number used to determine a reduced number of resource blocks by the communication device to transmit a reference signal, and
            (2) an offset value that indicates a start resource block index of the reduced number of resource blocks where the communication device is to transmit the reference signal,
         wherein each set of values is associated with a reference signal resource or a reference signal resource set,
         wherein the reduced number of resource blocks are determined by a division of a number of contiguous resource blocks by the partial frequency factor value, and
         wherein the number of contiguous resource blocks are indicated by a bandwidth of the reference signal and a bandwidth configuration of the reference signal; and
      perform a second transmission, after the first transmission and to the communication device, of one or more bits that indicate a set of one partial frequency factor value and one offset value from the multiple sets of values.

10. The network device of claim 9, wherein the multiple sets of values are transmitted in the first transmission using a radio resource control (RRC) signal or a medium access control-control element (MAC CE) signal.

11. The network device of claim 9, wherein the one or more bits are transmitted in the second transmission in one or more most significant bits (MSBs) in a modulation and coding scheme (MCS) field in a downlink control information (DCI).

12. The network device of claim 9, wherein the reference signal includes a sounding reference signal (SRS).

13. A communication device for wireless communication, comprising:
   a processor configured to implement a method, the processor configured to:
      receive a first transmission that indicates multiple sets of values,
         wherein each set of values includes:
            (1) a partial frequency factor value that indicates a number used to determine a reduced number of resource blocks by the communication device to transmit a reference signal, and
            (2) an offset value that indicates a start resource block index of the reduced number of resource blocks where the communication device is to transmit the reference signal,
         wherein each set of values is associated with a reference signal resource or a reference signal resource set,
         wherein the reduced number of resource blocks are determined by a division of a number of contiguous resource blocks by the partial frequency factor value, and
         wherein the number of contiguous resource blocks are indicated by a bandwidth of the reference signal and a bandwidth configuration of the reference signal; and
      receive a second transmission, after the first transmission and by the communication device, of one or more bits that indicate a set of one partial frequency factor value and one offset value from the multiple sets of values.

14. The communication device of claim 13, wherein the multiple sets of values are received in the first transmission using a radio resource control (RRC) signal or a medium access control-control element (MAC CE) signal.

15. The communication device of claim 13, wherein the one or more bits are received in the second transmission in one or more most significant bits (MSBs) in a modulation and coding scheme (MCS) field in a downlink control information (DCI).

16. The communication device of claim 13, wherein the reference signal includes a sounding reference signal (SRS).

* * * * *